United States Patent
Yang et al.

(10) Patent No.: US 12,497,083 B2
(45) Date of Patent: Dec. 16, 2025

(54) AUTONOMOUS DRIVING CONTROL APPARATUS, SYSTEM HAVING THE SAME, AND METHOD THEREOF

(71) Applicants: Hyundai Motor Company, Seoul (KR); Kia Corporation, Seoul (KR)

(72) Inventors: Seok Youl Yang, Incheon (KR); Sung Min Park, Seoul (KR); Rosali Sun Pyun, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 357 days.

(21) Appl. No.: 17/970,081

(22) Filed: Oct. 20, 2022

(65) Prior Publication Data

US 2023/0264719 A1 Aug. 24, 2023

(30) Foreign Application Priority Data

Feb. 18, 2022 (KR) ......................... 10-2022-0021690

(51) Int. Cl.
*B60W 60/00* (2020.01)
*B60W 40/06* (2012.01)
*B60W 40/105* (2012.01)

(52) U.S. Cl.
CPC ........ *B60W 60/0059* (2020.02); *B60W 40/06* (2013.01); *B60W 40/105* (2013.01); *B60W 60/0015* (2020.02); *B60W 60/0053* (2020.02); *B60W 60/0057* (2020.02); *B60W 2530/13* (2021.08); *B60W 2556/40* (2020.02)

(58) Field of Classification Search
None
See application file for complete search history.

(56) References Cited

U.S. PATENT DOCUMENTS

| | | | |
|---|---|---|---|
| 6,421,595 B1 * | 7/2002 | Gierling | F16H 61/66254 701/51 |
| 10,000,216 B2 | 6/2018 | Cullinane et al. | |
| 10,300,926 B2 | 5/2019 | Cullinane et al. | |
| 10,650,548 B1 * | 5/2020 | Kim | G01C 21/20 |
| 10,684,620 B2 | 6/2020 | Park et al. | |
| 11,084,501 B2 | 8/2021 | Ueno et al. | |

(Continued)

FOREIGN PATENT DOCUMENTS

| JP | 2016504232 A | 2/2016 |
|---|---|---|
| JP | 6461443 B2 | 1/2019 |

(Continued)

*Primary Examiner* — Redhwan K Mawari
*Assistant Examiner* — Kai Wang
(74) *Attorney, Agent, or Firm* — Slater Matsil, LLP (57) ABSTRACT

An embodiment autonomous driving control apparatus includes a memory storing data and algorithms and a processor configured to execute the algorithms stored in the memory to estimate an end of an operational design domain of an autonomous driving function in advance and to calculate a distance from an end point of the operational design domain to a start point of a transition demand, wherein the transition demand is a point at which a transition demand section starts based on a current speed of a vehicle depending on a driving strategy of the transition demand section for requiring a driver to drive the vehicle and a minimum risk maneuver section.

20 Claims, 7 Drawing Sheets

(56) References Cited

U.S. PATENT DOCUMENTS

| | | | |
|---|---|---|---|
| 11,678,599 B2* | 6/2023 | Birkland | B60W 40/068 |
| | | | 701/41 |
| 2008/0059007 A1* | 3/2008 | Whittaker | G08G 1/22 |
| | | | 701/2 |
| 2014/0350763 A1* | 11/2014 | Granato | B60W 10/06 |
| | | | 701/22 |
| 2016/0347327 A1* | 12/2016 | Kondo | B60W 50/08 |
| 2017/0028843 A1* | 2/2017 | Ogawa | B60K 17/02 |
| 2019/0011914 A1 | 1/2019 | Park et al. | |
| 2019/0263427 A1 | 8/2019 | Ueno et al. | |
| 2019/0317506 A1 | 10/2019 | Ishioka | |
| 2020/0150652 A1 | 5/2020 | Urano et al. | |
| 2020/0269839 A1* | 8/2020 | Sato | B60W 30/18163 |
| 2021/0061299 A1 | 3/2021 | Wang | |
| 2021/0109528 A1* | 4/2021 | Heyl | B60W 60/0018 |
| 2021/0149395 A1* | 5/2021 | Jonsson | B60W 50/082 |
| 2022/0161813 A1* | 5/2022 | Oba | B60W 60/0053 |
| 2022/0289252 A1* | 9/2022 | Liu | G08G 1/096741 |
| 2023/0037467 A1* | 2/2023 | Yamamoto | B60K 35/50 |
| 2023/0166761 A1* | 6/2023 | Khorsand Vakilzadeh | |
| | | | B60W 60/001 |

FOREIGN PATENT DOCUMENTS

| | | |
|---|---|---|
| KR | 101989523 B1 | 6/2019 |
| KR | 20200042390 A | 4/2020 |

\* cited by examiner

FIG.1

| AUTOMATION LEVEL | SAE CLASSIFICATION | SYSTEM | DRIVER |
|---|---|---|---|
| LEVEL 0 | NO AUTOMATION | TEMPORARY EMERGENCY INTERVENTION OR WARNING ONLY | PERFORMING ALL DRIVING FUNCTIONS |
| LEVEL 1 | DRIVER ASSISTANCE | PERFORMING SOME DRIVING FUNCTIONS SUCH AS STEERING AND DECELERATION/ACCELERATION TOGETHER WITH DRIVER PERFORMING DRIVING FUNCTION IN ALL SECTIONS | DETERMINING WHETHER/WHEN LEVEL 1 SYSTEM OPERATES AND PERFORMING ALL DRIVING FUNCTIONS EXCEPT STEERING WHEEL OR ACCELERATION/DECELERATION PEDAL CONTROL (INCLUDING MONITORING OF DRIVING ENVIRONMENT /VEHICLE OPERATION/ LEVEL 1 SYSTEM MONITORING AND IMMEDIATE EMERGENCY PRECAUTION) |
| LEVEL 2 | PARTIAL AUTOMATION | PERFORMING DRIVING FUNCTIONS SUCH AS STEERING AND ACCELERATION/DECELERATION INSTEAD UNDER BOARDING OF DRIVER WHO MONITORS STEERING AND DECELERATION/ACCELERATION DEVICES | DETERMINING WHETHER/WHEN SYSTEM OPERATES AND PERFORMING ALL OTHER DRIVING FUNCTIONS EXCEPT CONTROLLING ACCELERATION/DECELERATION PEDAL (INCLUDING MONITORING OF DRIVING ENVIRONMENT/ VEHICLE OPERATION/ LEVEL 2 SYSTEM MONITORING AND IMMEDIATE EMERGENCY PRECAUTION) |
| LEVEL 3 | CONDITIONAL AUTOMATION | TRANSFERING DRIVING CONTROL AUTHORITY TO DRIVER AND PERFORMING DRIVING FUNCTIONS SUCH AS STEERING AND ACCELERATION/DECELERATION IN SITUATION OTHER THAN CONDITIONS | DETERMINING WHETHER/WHEN SYSTEM OPERATES AND PERFORMING ALL OTHER DRIVING FUNCTIONS EXCEPT CONTROLLING STEERING WHEEL OR ACCELERATION/DECELERATION PEDAL (WHEN THERE IS REQUEST TO TRANSFER CONTROL AUTHORITY OF LEVEL 3 SYSTEM, IT IS REQUIRED TO RECEIVE IT AND PERFORM EMERGENCY PRECAUTION) |
| LEVEL 4 | HIGH AUTOMATION | PERFORMING ALL DRIVING FUNCTIONS UNDER BOARDING OF DRIVER FOR EXTREMELY EXCEPTIONAL SITUATIONS | WHEN THERE IS REQUEST TO TRANSFER CONTROL AUTHORITY OF LEVEL 4 SYSTEM, SELECTIVELY PERFORMING EMERGENCY PRECAUTION |
| LEVEL 5 | FULL AUTOMATION | PERFORMING FULL DRIVING FUNCTION CAPABLE OF RESPONDING TO ANY SITUATION WITHOUT DRIVER | ONLY DETERMINING WHETHER SYSTEM OPERATES AND NOT PERFORMING ALL DRIVING FUNCTIONS |

| CURRENT SPEED OF VEHICLE [km/h] | BASED ON END POINT OF OPERATION DESIGN DOMAIN | | |
|---|---|---|---|
| | DISTANCE TO LAST POINT CAPABLE OF ACTIVATING AUTONOMOUS DRIVING FUNCTION [m] | MINIMUM OPERATING DISTANCE [m]/ TIME [sec] | START POINT OF TRANSITION DEMAND [m] |
| 0 | 191.80 | 150 m / ∞ sec | 41.8 |
| 5 | 191.80 | 150 m / 107 sec | 41.8 |
| 10 | 215.52 | 150 m / 54 sec | 65.5 |
| 20 | 268.77 | 150 m / 48 sec | 118.8 |
| 30 | 329.72 | 150 m / 40 sec | 179.7 |
| 40 | 415.06 | 167 m / 15 sec | 248.4 |
| 50 | 533.12 | 208 m / 15 sec | 324.8 |
| 60 | 658.89 | 250 m / 15 sec | 408.9 |

FIG.4

| CURRENT SPEED OF VEHICLE [km/h] | BASED ON END POINT OF OPERATION DESIGN DOMAIN ||
| --- | --- | --- |
| | DISTANCE D1 TO LAST POINT CAPABLE OF ACTIVATING AUTONOMOUS DRIVING FUNCTION [m] | DISTANCE D2 FROM END POINT OF OPERATIONAL DESIGN DOMAIN TO START POINT OF TRANSITION DEMAND [m] |
| 0 | 191.80 | 41.8 |
| 5 | 191.80 | 41.8 |
| 10 | 215.52 | 65.5 |
| 20 | 268.77 | 118.8 |
| 30 | 329.72 | 179.7 |
| 40 | 415.06 | 248.4 |
| 50 | 533.12 | 324.8 |
| 60 | 658.89 | 408.9 |

FIG.7

AUTONOMOUS DRIVING CONTROL APPARATUS, SYSTEM HAVING THE SAME, AND METHOD THEREOF

CROSS-REFERENCE TO RELATED APPLICATIONS

This application claims the benefit of Korean Patent Application No. 10-2022-0021690, filed on Feb. 18, 2022, which application is hereby incorporated herein by reference.

TECHNICAL FIELD

The present disclosure relates to an autonomous driving control apparatus, a vehicle system including the same, and a method thereof.

BACKGROUND

Recently, a number of people interested in autonomous vehicles is increasing. A currently commercially available autonomous vehicle may apply an advanced driver assistance system (ADAS) not only to free a driver from simple tasks such as operating a steering wheel and pedals during driving, but also to prevent accidents in advance by reducing mistakes caused by a driver's carelessness.

An autonomous driving function of such an autonomous vehicle is set to be activated within a predetermined operational design domain for safety.

Then, the autonomous driving function is set not to be newly activated within a predetermined section from a point at which the operational design domain ends. However, it is important to determine from the end point of the operational design domain to which point as a section where the autonomous driving function is not newly activated. That is, in the case where the section where the autonomous driving function is not newly activated from the end point of the operational design domain is defined too long, an activation section of the autonomous driving function is short, and thus usability thereof may be lowered, while in the case where the section is defined too short, when the autonomous driving function is newly activated in a state of approaching the end point of the operational design domain, it transitions to a transition demand too quickly, thereby reducing usefulness thereof.

The above information disclosed in this background section is only for enhancement of understanding of the background of the disclosure, and therefore, it may contain information that does not form the prior art that is already known to a person of ordinary skill in the art.

SUMMARY

The present disclosure relates to an autonomous driving control apparatus, a vehicle system including the same, and a method thereof. Particular embodiments relate to a technique for accurately defining a point of request for activation of an autonomous driving function and driving change and notifying a driver of it in advance.

An exemplary embodiment of the present disclosure provides an autonomous driving control apparatus, a vehicle system including the same, and a method thereof, capable of improving reliability of an autonomous vehicle by clearly defining a possible distance to start activation of an autonomous driving function and a start point of a transition demand and defining a driving strategy of the transition demand and a minimum risk maneuver step at the end of an operational design domain (ODD) of the autonomous driving function when driving is performed at Level 3 of the autonomous driving function.

The technical features of embodiments of the present disclosure are not limited to the features mentioned above, and other technical features not mentioned can be clearly understood by those skilled in the art from the description of the claims.

An exemplary embodiment of the present disclosure provides an autonomous driving control apparatus including a processor configured to estimate an end of an operational design domain of an autonomous driving function in advance and to calculate a distance from an end point of the operational design domain to a start point of a transition demand which is a point at which a transition demand section starts based on a current speed of a vehicle depending on a driving strategy of the transition demand section for requiring a driver to drive the vehicle and a minimum risk maneuver section, and a memory configured to store data and algorithms driven by the processor.

In an exemplary embodiment, the processor may calculate a distance from the end point of the operational design domain to a last point capable of activating the autonomous driving function based on the distance to the start point of the transition demand.

In an exemplary embodiment, the processor may define a speed of a vehicle entering the transition demand section at an interval of a predetermined magnitude and may define maximum acceleration for stopping in the minimum risk maneuver section as a predetermined speed.

In an exemplary embodiment, the processor may set the transition demand section to start within a predetermined time from a time point at which the operational design domain ends.

In an exemplary embodiment, the processor may calculate a maximum mileage of the transition demand section and a maximum mileage of the minimum risk maneuver section depending on the speed of the vehicle.

In an exemplary embodiment, the processor may calculate the maximum mileage of the transition demand section using a predetermined maintaining time of the transition demand section and the speed of the vehicle.

In an exemplary embodiment, the processor may calculate a maximum mileage in the minimum risk maneuver section based on a predetermined deceleration of the vehicle and the current speed of the vehicle by using an acceleration formula.

In an exemplary embodiment, the processor may calculate a distance from the end point of the operational design domain to the start point of the transition demand by summing the maximum mileage of the transition demand section and the maximum mileage of the minimum risk maneuver section and then adding a design margin thereto.

In an exemplary embodiment, the processor may calculate the distance from the end point of the operational design domain to the last point capable of activating the autonomous driving function by adding a larger one of a distance from the end point of the operational design domain to the start point of the transition demand where the vehicle is able to travel for a minimum time after the autonomous driving function is activated and a minimum distance from the end point of the operational design domain to the start point of the transition demand after the autonomous driving function is activated, to the distance to the start point of the transition demand.

In an exemplary embodiment, the end point of the operational design domain may include at least one of, when a forward driving lane is a highway or an exclusive road for automobiles, a point at which the highway or the exclusive road ends, a point of entering an interchange (IC) or junction (JC) on the highway or the exclusive road, a tollgate entry point on the highway or the exclusive road, a point at which the forward driving lane enters a rest area lane, a point at which the forward driving lane enters a merging lane, a point at which the forward driving lane enters a reversible lane, or a point at which the forward driving lane enters a bus-only lane.

In an exemplary embodiment, the processor may determine that the autonomous driving function is able to be activated when a distance from the current position of the vehicle to the end point of the operational design domain is greater than the distance from the end point of the operational design domain to the last point capable of activating the autonomous driving function.

In an exemplary embodiment, the processor may generate a driving path based on surrounding information and a precision map and may perform autonomous driving control based on the driving path when the autonomous driving function is able to be activated.

In an exemplary embodiment, the processor may define the driving strategy of the transition demand section and the minimum risk maneuver section while performing autonomous driving control based on a precision map in a conditional autonomous driving step of an autonomous driving function stage.

An exemplary embodiment of the present disclosure provides a vehicle system including a sensing device configured to sense vehicle surrounding information, a map database configured to store a lane-based precision map, and an autonomous driving control apparatus configured to estimate an end of an operational design domain of an autonomous driving function in advance and to calculate a distance from an end point of the operational design domain to a start point of a transition demand which is a point at which a transition demand section starts based on a current speed of a vehicle depending on a driving strategy of the transition demand section for requiring a driver to drive the vehicle and a minimum risk maneuver section, and configured to control autonomous driving of the vehicle based on surrounding information of the vehicle and the precision map.

In an exemplary embodiment, the autonomous driving control apparatus may calculate a distance from the end point of the operational design domain to a last point capable of activating the autonomous driving function based on the distance to the start point of the transition demand.

An exemplary embodiment of the present disclosure provides an autonomous driving control method including estimating an end of an operational design domain of an autonomous driving function in advance and calculating a distance from an end point of the operational design domain to a start point of a transition demand which is a point at which a transition demand section starts based on a current speed of a vehicle depending on a driving strategy of the transition demand section for requiring a driver to drive the vehicle and a minimum risk maneuver section.

In an exemplary embodiment, it may further include calculating a distance from the end point of the operational design domain to a last point capable of activating the autonomous driving function based on the distance to the start point of the transition demand.

In an exemplary embodiment, the calculating of the distance from the end point of the operational design domain to the start point of the transition demand which is the point at which the transition demand section starts may include calculating the maximum mileage of the transition demand section using a predetermined maintaining time of the transition demand section and the speed of the vehicle and calculating a maximum mileage in the minimum risk maneuver section based on a predetermined deceleration of the vehicle and the current speed of the vehicle by using an acceleration formula.

In an exemplary embodiment, the calculating of the distance from the end point of the operational design domain to the last point capable of activating the autonomous driving function may include adding a larger one of a distance from the end point of the operational design domain to the start point of the transition demand where the vehicle is able to travel for a minimum time after the autonomous driving function is activated and a minimum distance from the end point of the operational design domain to the start point of the transition demand after the autonomous driving function is activated, to the distance to the start point of the transition demand, and calculating the distance from the end point of the operational design domain to the last point capable of activating the autonomous driving function.

In an exemplary embodiment, it may further include determining that the autonomous driving function is able to be activated when a distance from the current position of the vehicle to the end point of the operational design domain is greater than the distance from the end point of the operational design domain to the last point capable of activating the autonomous driving function.

According to embodiments of the present invention, it is possible to improve reliability of an autonomous vehicle by clearly defining a possible distance to start activation of an autonomous driving function and a start point of a transition demand and defining a driving strategy of the transition demand and a minimum risk maneuver step at the end of an operational design domain (ODD) of the autonomous driving function when driving is performed at Level 3 of the autonomous driving function.

In addition, various effects that can be directly or indirectly identified through this document may be provided.

BRIEF DESCRIPTION OF THE DRAWINGS

FIG. 2 illustrates a table in which an automation level of an autonomous vehicle is defined.

DETAILED DESCRIPTION OF ILLUSTRATIVE EMBODIMENTS

Hereinafter, some exemplary embodiments of the present disclosure will be described in detail with reference to exemplary drawings. It should be noted that in adding reference numerals to constituent elements of each drawing, the same constituent elements have the same reference numerals to the extent possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 7.

Figure 1:
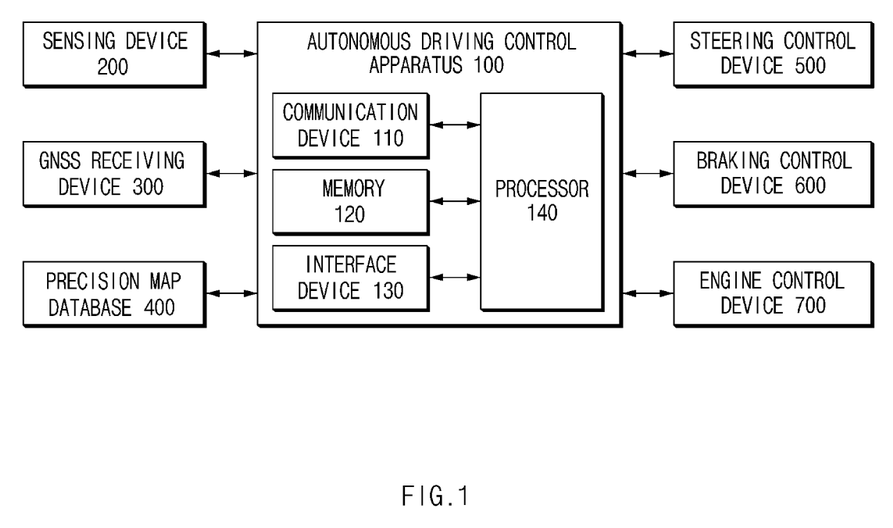
FIG. 1 illustrates a block diagram showing a configuration of a vehicle system including an autonomous driving control apparatus according to an exemplary embodiment of the present disclosure.

FIG. 1 illustrates a block diagram showing a configuration of a vehicle system including an autonomous driving control apparatus according to an exemplary embodiment of the present disclosure.

Referring to FIG. 1, the vehicle system according to an exemplary embodiment of the present disclosure may include an autonomous driving control apparatus 100, a sensing device 200, a GNSS receiving device 300, a precision map database 400, a steering control device 500, a braking control device 600, and an engine control device 700.

The autonomous driving control apparatus 100 according to an exemplary embodiment of the present disclosure may be implemented inside the vehicle. In this case, the autonomous driving control apparatus 100 may be integrally formed with internal control units of the vehicle, or may be implemented as a separate device to be connected to control units of the vehicle by a separate connection means.

The autonomous driving control apparatus 100 may estimate an end of an operational design domain of an autonomous driving function in advance, and depending on a driving strategy of a transition demand section for requiring a driver to drive the vehicle and a minimum risk maneuver section, it may calculate a distance from an end point of the operational design domain to a start point of a transition demand which is a point at which the transition demand section starts based on a current speed of the vehicle.

In addition, the autonomous driving control apparatus 100 may calculate a distance from the end point of the operational design domain to a last point capable of activating the autonomous driving function based on the distance to the start point of the transition demand.

In this case, the transition demand (TD) section indicates a section waiting for the driver to transfer control authority, and the minimum risk maneuver (MRM) section indicates a section for aiming to enable to stop the vehicle in a lane without transferring control authority.

The start point of the transition demand is a start point of the TD section, which indicates a point that requires a driver to drive the vehicle. In embodiments of the present disclosure, the distance from the end point of the operational design domain to the start point of the transition demand indicates a section obtained by adding the TD section and the MRM section.

In addition, the operational design domain (ODD) of the autonomous driving function is a section in which a precision map is built, which indicates a section in which the autonomous driving function can be activated. For example, the operational design domain may include an automobile-only road, a road on which a precision map is built, a highway, and the like, and may be separately set by a user.

The end point of the operational design domain may include, e.g., an end point of a highway or exclusive road of a front driving road, an interchange (IC) or junction (JC) entry point, a tollgate (TG) entry point, etc., and may further include a service area lane entry point, a merging lane entry point, a reversible lane entry point, a bus-only lane entry point, and the like of the forward driving lane. However, the end point of the operational design domain is not limited to the above-described examples.

In addition, the autonomous driving function may include a lane following function, etc., and the lane following function may include a function for enabling a driver to start the vehicle and the vehicle to follow a lane by controlling lateral movement of the vehicle without an additional command or approval from a user from the driver for a long time, and for controlling longitudinal movement thereof.

FIG. 2 illustrates a table in which an automation level of an autonomous vehicle is defined.

The autonomous vehicle indicates a vehicle that drives itself by recognizing driving circumstances by itself to determine a risk and by minimizing a driving operation of a driver while controlling a driving path.

Ultimately, the autonomous vehicle indicates a vehicle that can be driven, steered and parked without human influence, which focuses on vehicles that are at their most advanced in an autonomous driving technique, i.e., ability to drive a vehicle without active control or monitoring of the driver, which is a core foundation of autonomous vehicles.

An automation level of the autonomous vehicle based on the Society of Automotive Engineers (SAE), which is the American Association of Automobile Engineers, may be classified as shown in a table of FIG. 2.

Referring to FIG. 2, in the automation levels LEVEL 0 to LEVEL 2, a driving environment is monitored by a driver. On the other hand, in the automation levels LEVEL 3 to LEVEL 5, the driving environment is monitored by an automated driving system.

However, a concept of an autonomous vehicle currently being launched may include an intermediate level of automation leading to a fully autonomous vehicle, which corresponds to a goal-oriented concept premised on mass production and commercialization of a fully autonomous vehicle.

An autonomous driving control method according to embodiments of the present disclosure may be applied to an autonomous vehicle corresponding to LEVEL 3 (conditional autonomous driving) among automation levels of autonomous driving illustrated in FIG. 2, but the present disclosure is not necessarily limited thereto, and may be applied to an autonomous vehicle that supports a plurality of different automation levels.

Referring back to FIG. 1, the autonomous driving control apparatus 100 may include a communication device 110, a memory (i.e., a storage) 120, an interface device 130 and a processor 140.

The communication device no is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device no may perform communication by using a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world interoperability for microwave access (Wimax), etc. In addition, the short-range communication technique may include Bluetooth, ZigBee, ultra wideband (UWB), radio frequency identification (RFID), infrared data association (IrDA), and the like. As an example, the communication device no may receive a sensing result from the sensing device 200, may receive GNSS reception information from the GNSS receiving device 300, and may receive a precision map from the precision map database 400.

The memory 120 may store data and/or algorithms required for the processor 140 to operate, and the like. As an example, the memory 120 may store a sensing result received through the communication device no, the GNSS reception information, the precision map, and the like.

The memory 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. In addition, the input means may include a soft key implemented on the display.

The interface device 130 may be implemented as a head-up display (HUD), a cluster, an audio video navigation (AVN), or a human machine interface (HMI).

The output device may include a display and may also include a voice output means such as a speaker. In this case, when a touch sensor formed of a touch film, a touch sheet, or a touch pad is provided on the display, the display may operate as a touch screen and may be implemented in a form in which an input device and an output device are integrated. As an example, the output device may output autonomous driving state information of the vehicle, a driver control authority switching request screen, and the like.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the memory 120, the interface device 130, and the like, may electrically control each component, and may be an electrical circuit that executes software commands, thereby performing various data processing and calculations described below.

The processor 140 may process signals transferred between constituent elements of the autonomous driving control apparatus 100. The processor 140 may be, e.g., an electronic control unit (ECU), a micro controller unit (MCU), or other subcontrollers mounted in the vehicle.

The processor 140 may estimate an end of an operational design domain of an autonomous driving function in advance, and depending on a driving strategy of a transition demand section for requiring a driver to drive the vehicle and a minimum risk maneuver section, it may calculate a distance from an end point of the operational design domain to a start point of a transition demand which is a point at which the transition demand section starts based on a current speed of the vehicle.

The processor 140 may calculate a distance from the end point of the operational design domain to a last point capable of activating the autonomous driving function based on the distance to the start point of the transition demand.

The processor 140 may define a speed of a vehicle entering the transition demand section at an interval of a predetermined magnitude (e.g., unit of 5 km/h) in the transition demand section, and may define maximum acceleration ($-1$ m/s$^2$) for stopping in the minimum risk maneuver section as a predetermined speed.

The processor 140 may set the transition demand section to start within a predetermined time from a time point at which the operational design domain ends.

The processor 140 may calculate a maximum mileage of the transition demand section and a maximum mileage of the minimum risk maneuver section depending on a vehicle speed.

The processor 140 may calculate the maximum mileage of the transition demand section using a predetermined maintaining time of the transition demand section and the vehicle speed.

The processor 140 may calculate a maximum mileage in the minimum risk maneuver section based on a predetermined deceleration of the vehicle and a current speed of the vehicle using an acceleration formula.

The processor 140 may calculate a distance from the end point of the operational design domain to the start point of the transition demand by summing the maximum mileage of the transition demand section and the maximum mileage of the minimum risk maneuver section and then adding a design margin thereto.

The processor 140 may calculate the distance from the end point of the operational design domain to the last point capable of activating the autonomous driving function by adding a larger one of a distance from the end point of the operational design domain to the start point of the transition demand where the vehicle can travel for a minimum time after the autonomous driving function is activated and a minimum distance from the end point of the operational design domain to the start point of the transition demand after the autonomous driving function is activated, to the distance to the start point of the transition demand.

In this case, when a forward driving lane is a highway or an exclusive road for automobiles, the end point of the operational design domain may include at least one of, when a forward driving lane is a highway or an exclusive road for automobiles, a point at which the highway or the exclusive road ends, a point of entering an interchange (IC) or junction (JC) on the highway or the exclusive road, a tollgate entry point on the highway or the exclusive road, a point at which the forward driving lane enters a rest area lane, a point at which the forward driving lane enters a merging lane, a point at which the forward driving lane enters a reversible lane, or a point at which the forward driving lane enters a bus-only lane.

The processor 140 may determine that the autonomous driving function can be activated when a distance from a current position of the vehicle to the end point of the operational design domain is greater than the distance from the end point of the operational design domain to the last point capable of activating the autonomous driving function.

When the autonomous driving function can be activated, the processor 140 may generate a driving path based on surrounding information and a precision map and may perform autonomous driving control based on the driving path.

The processor 140 may define the driving strategy of the transition demand section and the minimum risk maneuver section while performing the autonomous driving control based on a precision map in a conditional autonomous driving step of an autonomous driving function stage.

The sensing device 200 may include one or more sensors that sense an obstacle positioned around the vehicle, e.g., a preceding vehicle, the end point of the operational design domain in front, etc., and measure a distance with the obstacle and/or a relative speed thereof. The sensing device 200 may include a camera, a lidar, a radar, an ultrasonic wave sensor, and the like.

The GNSS receiving device 300 receives position information from a global navigation satellite system (GNSS) to provide it to the autonomous driving control apparatus 100. Accordingly, the processor 140 may determine a current position of the host vehicle.

The precision map database 400 stores the precision map including lane information, road properties, and lane properties, and provides it to the autonomous driving control apparatus 100. Accordingly, the processor 140 may generate a driving path based on the precision map and may determine the end point of the operational design domain in advance.

The steering control device 500 may be configured to control a steering angle of a vehicle, and may include a steering wheel, an actuator interlocked with the steering wheel, and a controller controlling the actuator.

The braking control device 600 may be configured to control braking of the vehicle and may include a controller that controls a brake thereof.

The engine control device 700 may be configured to control engine driving of a vehicle and may include a controller that controls a speed of the vehicle.

As such, according to embodiments of the present disclosure, in the case of driving in autonomous driving of Level 3, when the end point of the operational design domain in front of a driving lane of the vehicle is expected, it is possible to improve reliability of the autonomous driving function by optimizing the distance from the end point of the operational design domain to the last point capable of activating the autonomous driving function and a distance to the start point of the transition demand.

In addition, according to embodiments of the present disclosure, in the case of driving in autonomous driving of Level 3, it is possible to increase usability of the autonomous driving function by defining a strategy of the transition demand and the minimum risk maneuver.

Figure 3:
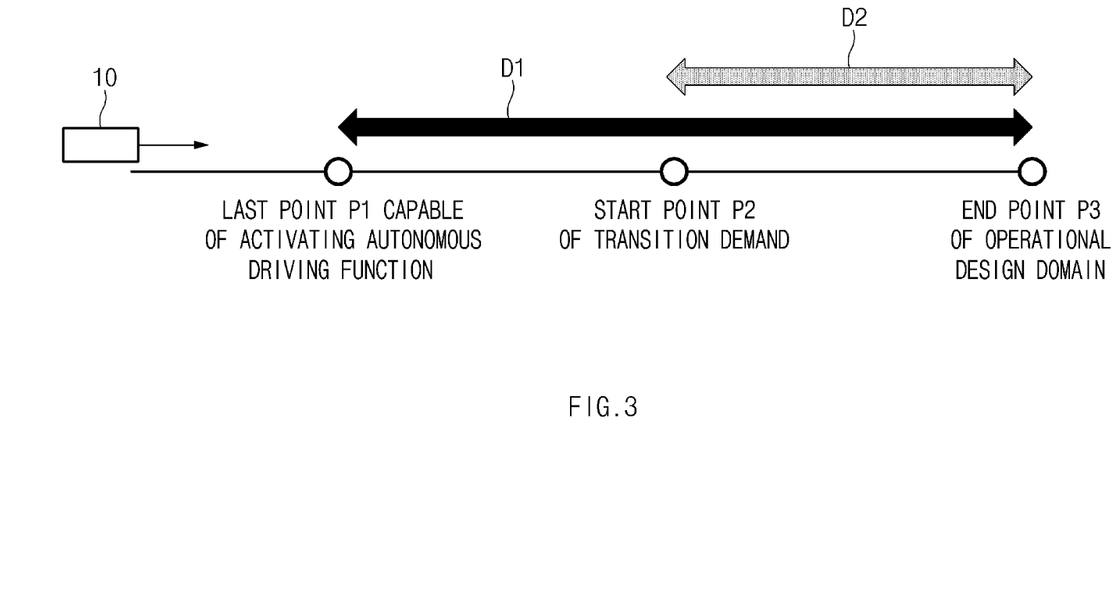
FIG. 3 illustrates an exemplary view for describing a method of defining a last point capable of activating an autonomous driving function and a start point of a transition demand for an autonomous driving control apparatus according to an exemplary embodiment of the present disclosure.
Figure 4:
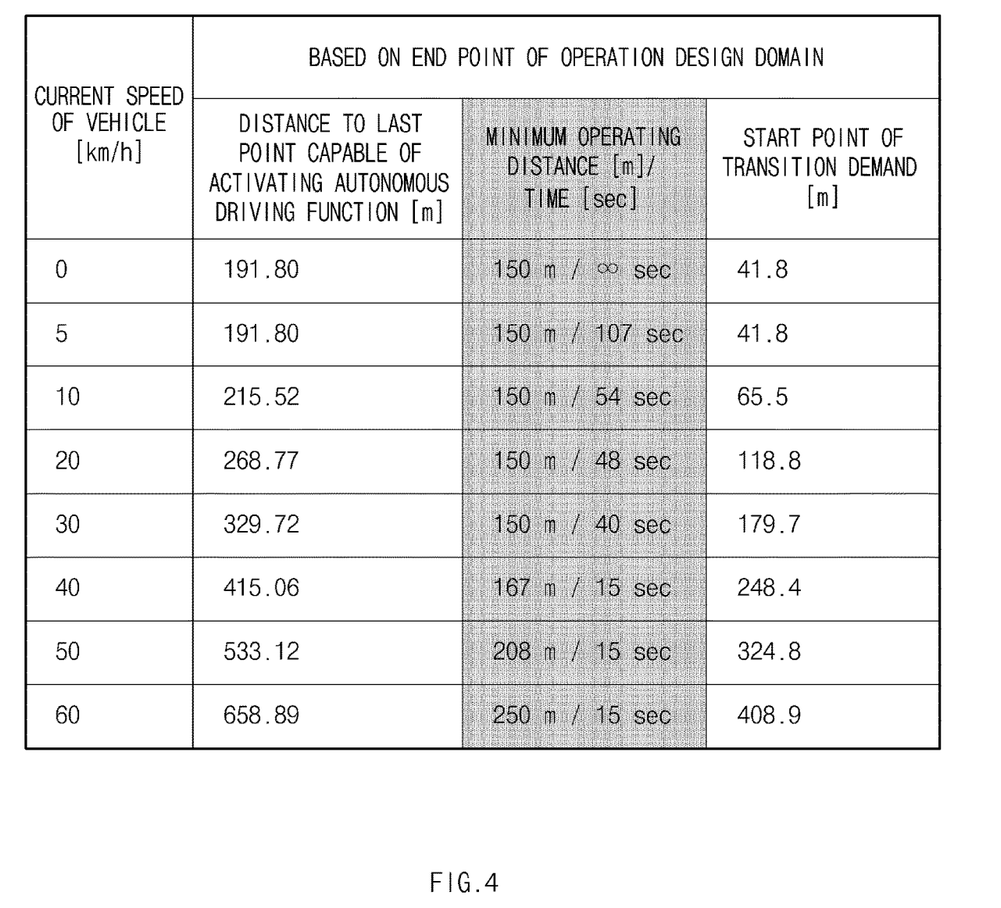
FIG. 4 illustrates a table for describing a process of calculating a distance to a last point capable of activating an autonomous driving function and a distance to a start point of a transition demand for each vehicle speed according to an exemplary embodiment of the present disclosure.
Figure 5:
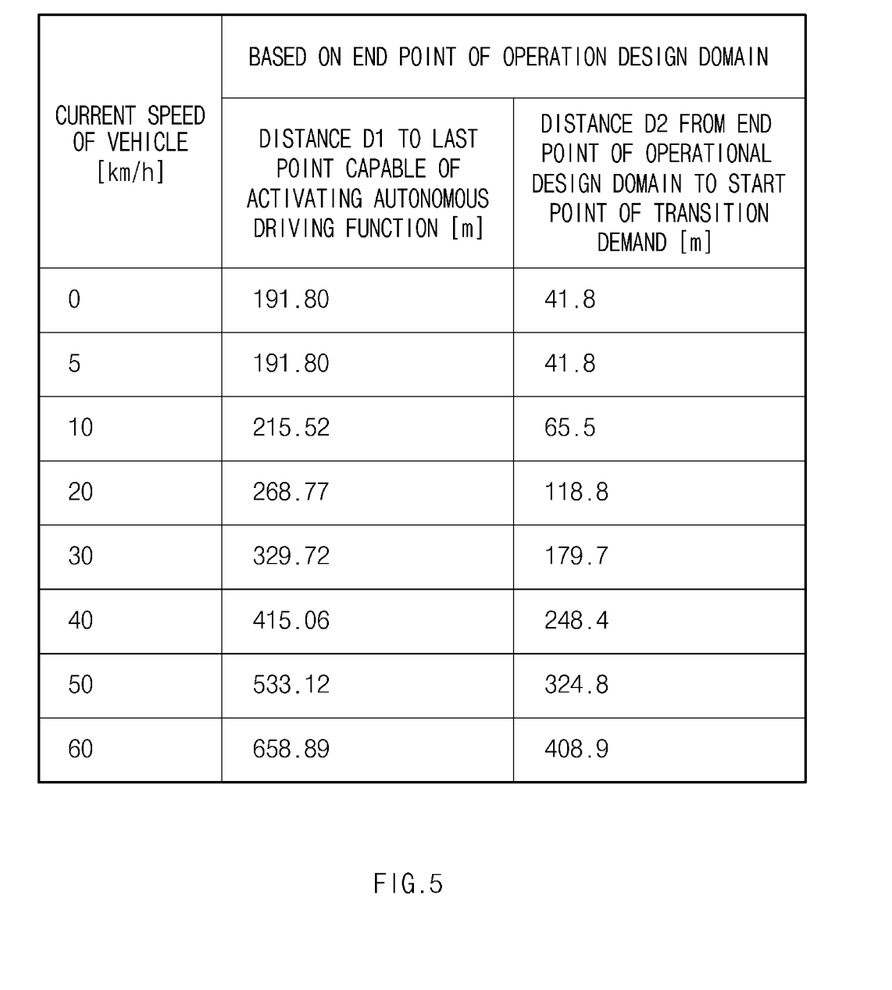
FIG. 5 illustrates a table showing an example of a distance to a last point capable of activating an autonomous driving function and a distance to a start point of a transition demand for each vehicle speed according to an exemplary embodiment of the present disclosure.

Hereinafter, processes of defining the strategy of the transition demand and the minimum risk maneuver, and when an end of the operational design zone is expected, defining the distance to the start point of the transition demand and the distance to the last point capable of activating the autonomous driving function within the operational design domain will be described with reference to FIG. 3 to FIG. 5. FIG. 3 illustrates an exemplary view for describing a method of defining a last point capable of activating an autonomous driving function and a start point of a transition demand for an autonomous driving control apparatus according to an exemplary embodiment of the present disclosure, and FIG. 4 illustrates a table for describing a process of calculating a distance to a last point capable of activating an autonomous driving function and a distance to a start point of a transition demand for each vehicle speed according to an exemplary embodiment of the present disclosure. FIG. 5 illustrates a table showing an example of a distance to a last point capable of activating an autonomous driving function and a distance to a start point of a transition demand for each vehicle speed according to an exemplary embodiment of the present disclosure.

As illustrated in FIG. 3, when it is determined that an end point of the operational design domain exists in front while the vehicle 10 is driving, the autonomous driving control apparatus 100 may calculate a distance D1 from an end point P3 of an operational design domain to a last point P1 capable of activating an autonomous driving function and a distance D2 from the end point P3 of the operational design domain to a start point P2 of a transition demand, for each vehicle speed.

The autonomous driving control apparatus 100 may define a longitudinal driving strategy of a transition demand (TD) and a minimum risk maneuver (MRM).

That is, the autonomous driving control apparatus 100 may define a speed at a time of entering the transition demand in units of 5 km/h in a transition demand section, and may define this speed as a maximum speed limit of the transition demand section. In addition, the autonomous driving control apparatus 100 may set the maximum speed limit in units of 5 km/h in consideration of a display specification. For example, it may be set within 5 km/h to 130 km/h in units of 5 km/h.

In a normal estimated road event, there is no case where transition is performed by the transition demand while a speed of entering the transition demand is 0 km/h, and thus the autonomous driving control apparatus 100 may set a minimum speed of entering the transition demand as 5 km/h.

For example, when the speed at the time of entering the transition demand is 22 km/h, the autonomous driving control apparatus 100 may set a speed limit of the transition demand section to 25 km/h.

In addition, the autonomous driving control apparatus 100 may define maximum acceleration for stopping in the MRM section as $-1$ m/s$^2$, for example. In this case, the transition demand section indicates a section waiting for the driver to transfer control authority, and the MRM section indicates a section for aiming to enable to stop the vehicle in a lane without transferring control authority. In this case, the transition demand defined in the law should start at least 15 seconds before the operational design domain ends.

In addition, as illustrated in FIG. 3, when the end point P3 of the operational design domain is expected, such as an end point of the exclusive road for automobiles, the autonomous driving control apparatus 100 may define the start point P2 for the transition demand.

In addition, the autonomous driving control apparatus 100 may calculate maximum mileages of the transition demand and the MRM depending on a speed of entering the transition demand of the autonomous vehicle based on a longitudinal driving strategy of the transition demand section and the MRM section.

In addition, the autonomous driving control apparatus 100 may set a maintaining time of the transition demand defined in the law to 10 seconds, so that the maximum mileage of the transition demand section may be calculated as shown in Equation 1 below.

Maximum mileage in transition demand section=
(vehicle speed in units of 5 km/h)×10 sec     Equation 1

For example, when a current vehicle speed is 10 km/h, the maximum mileage in the transition demand section is (10/3.6)*(10+margin (e.g., 5 seconds))=27.777.

In addition, the autonomous driving control apparatus 100 may calculate a maximum mileage for minimum risk maneuver. That is, the minimum risk maneuver section is a final step in which the vehicle is safely stopped. Then, the vehicle stops by fixing the deceleration in the minimum risk maneuver section, and the acceleration at this time may be set to −1 m/s². The acceleration formula is as shown in Equation 2 below.

$$2as = v_0^2 - v_1^2$$     Equation 2

"a" indicates deceleration, "s" indicates distance, and "v" indicates speed. Then, since the deceleration is −1 m/s2 based on the acceleration formula, the distance s may be expressed as Equation 3 below.

$$s = \frac{0^2 - v^2}{2X - 1} = \frac{v^2}{2}$$     Equation 3

Accordingly, the autonomous driving control apparatus 100 may calculate the maximum mileage of the MRM section as a deceleration section at −1 m/s2 as shown in Equation 4 below.

Maximum mileage in MRM section=(vehicle speed
in units of 5 km/h)²/2     Equation 4

For example, when the current vehicle speed is 10 km/h, the maximum mileage in the MRM section is (10/3.6)²/2=41.666. As such, the maximum mileage in the MRM section may be calculated based on the acceleration formula.

The maximum mileage is calculated as a sum of a maximum mileage of the transition demand section and a maximum mileage of the MRM section as shown in Equation 5 below.

Maximum mileage=Maximum mileage of transition
demand section+Maximum mileage of MRM
section     Equation 5

In addition, the autonomous driving control apparatus 100 has to operate lane keeping and inter-vehicle distance keeping normally even in the transition demand section and the MRM section, and thus the maximum mileage is the same as in the case where there is no target for keeping the inter-vehicle distance.

In addition, the autonomous driving control apparatus 100 may calculate a distance from the end point of the operational design domain to the start point of the transition demand by adding the maximum mileage and the design margin (maximum value of 1 second distance or 20 m of the speed limit for transition demand).

Distance to start point of final transition
demand=maximum mileage+design margin     Equation 6

Then, when the current vehicle speed is 10 km/h, a distance to a start point of a final transition demand becomes 27.777+41.666+MAX(10/3.6, 20)=27.777+41.666+20=89.443.

As illustrated in FIG. 4, the distance D2 to the start point of the transition demand for each current speed of the vehicle may be calculated. FIG. 4 illustrates an example of the distance to the start point of the transition demand when the current speed of the vehicle is 0, 5, 10, 20, 30, 40, 50, and 60, but this is only an example, and the distance D2 to the start point of the transition demand may be calculated from the current speed of the vehicle up to 130 km/h in units of 5 km/h.

In addition, the autonomous driving control apparatus 100 may define the distance to the last point capable of activating the autonomous driving function within the operational design domain.

That is, the autonomous driving control apparatus 100 may use a larger value among activation distance reference values derived by defining 'a minimum time until a time of the transition demand due to an expected case after activation of the autonomous driving function' and 'a minimum distance to the start point of the transition demand due to the expected case after the activation of the autonomous driving function.'

For example, the minimum time until the time of the transition demand due to the expected case after the activation may be set to 15 seconds, and the minimum distance to the start point of the transition demand due to the expected case after the activation may be set to 150 m.

As illustrated in FIG. 4, the distance D1 to the last point capable of activating the autonomous driving function may be calculated by adding a greater one of the minimum time (15 seconds) until the time of the transition demand or the minimum distance (15 m) to the start point of the transition demand due to the expected case after the activation.

For example, when the vehicle speed is 10 km/h, the distance D1 to the last point capable of activating the autonomous driving function becomes 215.5 m by adding 150 m, which is the greater one of the mileage for 15 seconds and 150 m, to the distance 65.5 to the last point capable of activating the autonomous driving function.

When the vehicle speed is 60 km/h, since the mileage for 15 seconds is 250 m, the distance D1 to the last point capable of activating the autonomous driving function becomes 658.8 m by adding 250 m, which is greater than 150 m, to the distance 408.9 to the last point capable of activating the autonomous driving function.

Accordingly, as illustrated in FIG. 5, finally, it may calculate the distance D1 from the end point P3 of the operational design domain to the last point P1 capable of activating the autonomous driving function and the distance D2 from the end point P3 of the operational design domain to the start point P2 of the transition demand, for each vehicle speed.

Figure 6:
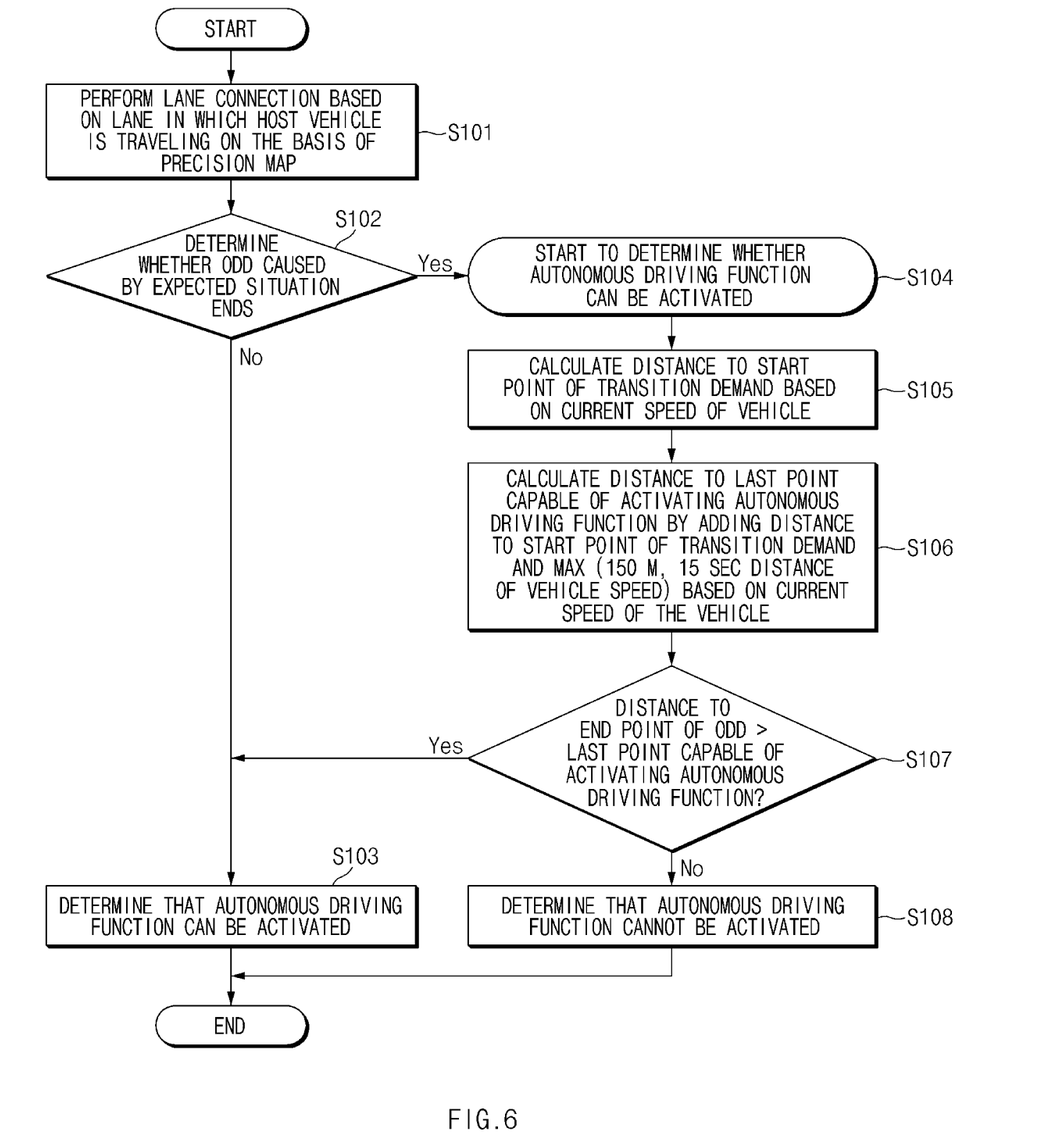
FIG. 6 illustrates an autonomous driving control method for a vehicle according to an exemplary embodiment of the present disclosure.

Hereinafter, an autonomous driving control method according to an exemplary embodiment of the present disclosure will be described in detail with reference to FIG. 6. FIG. 6 illustrates an autonomous driving control method for a vehicle according to an exemplary embodiment of the present disclosure.

Hereinafter, it is assumed that the autonomous driving control apparatus 100 of FIG. 1 performs processes of FIG. 6. In addition, in the description of FIG. 6, operations described as being performed by a device may be understood as being controlled by the processor 140 of the autonomous driving control apparatus 100.

Referring to FIG. 6, the autonomous driving control apparatus 100 sets a path to a destination based on a lane in which a host vehicle is traveling on the basis of a precision map (S101).

Accordingly, the autonomous driving control apparatus 100 determines whether the operational design domain caused by an expected situation in front of the lane in which the host vehicle is traveling ends (S102). In this case, the expected situation refers to a situation in which the operational design domain such as the end point of the exclusive road for automobiles and the exit of the highway is expected to end to generate the transition demand.

When the operational design domain does not end, the autonomous driving control apparatus 100 may determine that the autonomous driving function can be activated (S103), and may activate the autonomous driving function.

On the other hand, when the operational design domain is to be ended, the autonomous driving control apparatus 100 starts to determine whether autonomous driving can be activated (S104).

The autonomous driving control apparatus 100 calculates a distance from the end point of the operational design domain to the start point of the transition demand based on a current speed of the vehicle (S105).

In addition, the autonomous driving control apparatus 100 may calculate a distance to the last point capable of activating the autonomous driving function by adding the distance to the start point of the transition demand and a MAX (150 m, 15 sec distance of the vehicle speed) based on the current speed of the vehicle (S106).

Then, the autonomous driving control apparatus 100 determines whether a distance from a current position of the vehicle to the end point of the operational design domain is greater than the distance to the last point capable of activating the autonomous driving function (S107). When the distance from the current position of the vehicle to the end point of the operational design domain is greater than the distance to the last point capable of activating the autonomous driving function, the autonomous driving control apparatus 100 determines that the autonomous driving function can be activated (S103), and when the distance from the current position of the vehicle to the end point of the operational design domain is smaller than or equal to the distance to the last point capable of activating the autonomous driving function, the autonomous driving control apparatus 100 determines that the autonomous driving function cannot be activated (S108).

As such, according to embodiments of the present disclosure, in the case of driving in autonomous driving of Level 3, which is a conditional autonomous driving step, it is possible to secure safety of the autonomous driving function while increasing usability of the autonomous driving function by optimally calculating the distance from the end point of the operational design zone to the start point of the transition demand and the last point capable of the autonomous driving function depending on the current speed of the vehicle based on a longitudinal driving strategy of a transition demand section and a minimum risk maneuver section.

Figure 7:
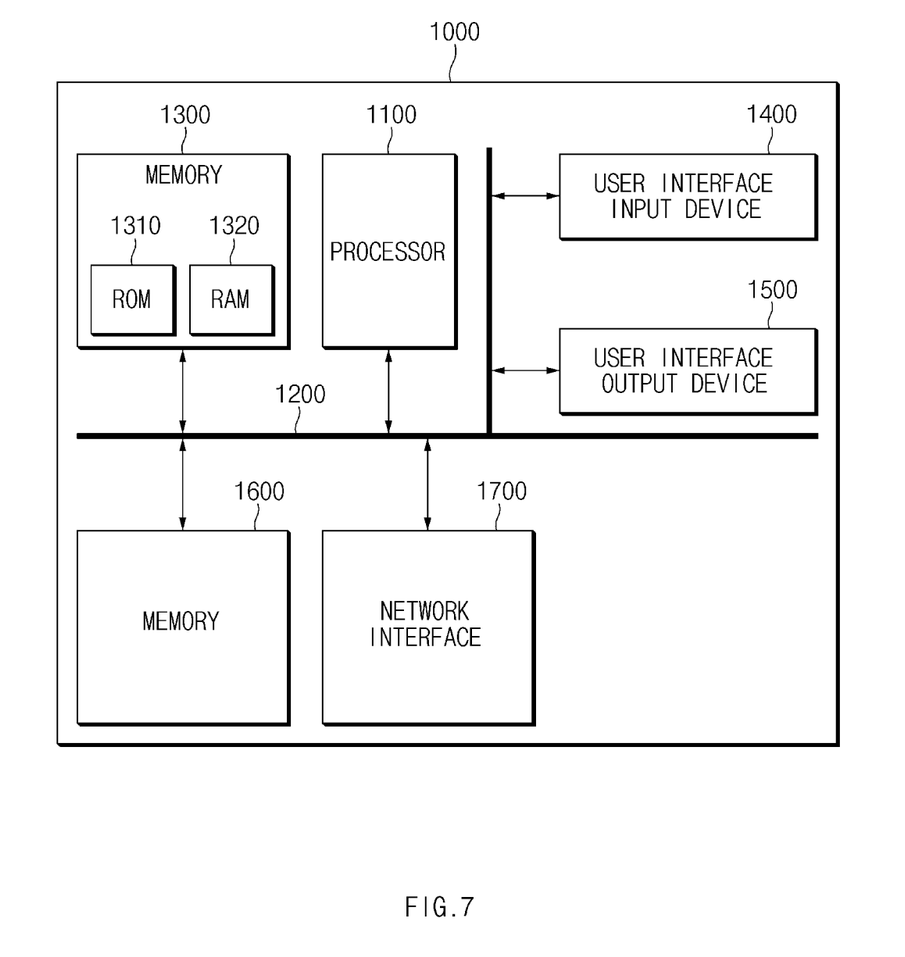
FIG. 7 illustrates a computing system according to an exemplary embodiment of the present disclosure.

FIG. 7 illustrates a computing system according to an exemplary embodiment of the present disclosure.

Referring to FIG. 7, the computing system 1000 includes at least one processor 1100 connected through a bus 1200, a memory 1300, a user interface input device 1400, a user interface output device 1500, and a memory (i.e., a storage) 1600, and a network interface 1700.

The processor 1100 may be a central processing unit (CPU) or a semiconductor device that performs processing on commands stored in the memory 1300 and/or the memory 1600. The memory 1300 and the memory 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the memory 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An autonomous driving control apparatus comprising:
memory storing data and algorithms; and
a processor configured to execute the algorithms stored in the memory to:
estimate an end of an operational design domain of an autonomous driving function in advance and to calculate a distance from an end point of the operational design domain to a start point of a transition demand starting requesting to transfer driving control to a driver during autonomous driving,
control autonomous driving of a vehicle using the distance from the end point of the operational design domain to the start point of the transition demand, wherein:

the transition demand is a point at which a transition demand section starts based on a current speed of the vehicle at a time of entering the transition demand and a predetermined speed limit of the transition demand section for requiring the driver to drive the vehicle before reaching the operational design domain and a predetermined acceleration set for stopping in a minimum risk maneuver section including a driving strategy to slow down and stop the vehicle when a dangerous situation occurs during autonomous driving, and the transition demand section indicates a section waiting for the driver to transfer control authority, and the minimum risk maneuver section indicates a section for aiming to enable to stop the vehicle in a lane without transferring control authority, calculate the distance from the end point of the operational design domain to the start point of the transition demand starting requesting in real time based on the current speed of the vehicle, calculating the distance comprising summing a maximum mileage that the vehicle is capable of driving in the transition demand section and a maximum mileage that the vehicle is capable of driving in the minimum risk maneuver section, and initiate the transition demand starting requesting at the start point of the transition demand starting requesting calculated in real time.

2. The autonomous driving control apparatus of claim 1, wherein the processor is configured to execute the algorithms to calculate a distance from the end point of the operational design domain to a last point capable of activating the autonomous driving function which is an end point of a section where the autonomous driving function is capable of activating based on a distance to the start point of the transition demand, wherein the processor is configured to execute the algorithms to calculate a distance from the end point of the operational design domain to the start point of the transition demand by summing the maximum mileage that the vehicle is capable of driving in the transition demand section and the maximum mileage that the vehicle is capable of driving in the minimum risk maneuver section and then adding a design margin thereto.

3. The autonomous driving control apparatus of claim 2, wherein the processor is configured to execute the algorithms to define a speed of the vehicle entering the transition demand section at an interval of a predetermined magnitude and to define maximum acceleration for stopping in the minimum risk maneuver section as the predetermined speed.

4. The autonomous driving control apparatus of claim 2, wherein the processor is configured to execute the algorithms to set the transition demand section to start within a predetermined time before a time point at which the operational design domain ends.

5. The autonomous driving control apparatus of claim 2, wherein the processor is configured to execute the algorithms to calculate maximum mileage that the vehicle is capable of driving in the transition demand section which is capable of driving in the transition demand section during a predetermined time for the transition demand section and the maximum mileage that the vehicle is capable of driving in the minimum risk maneuver section which is capable of driving in the minimum risk maneuver section during a predetermined time for the minimum risk maneuver section depending on the current speed of the vehicle.

6. The autonomous driving control apparatus of claim 5, wherein the processor is configured to execute the algorithms to calculate the maximum mileage that the vehicle is capable of driving in the transition demand section using a predetermined maintaining time of the transition demand section and the current speed of the vehicle.

7. The autonomous driving control apparatus of claim 5, wherein the processor is configured to execute the algorithms to calculate the maximum mileage that the vehicle is capable of driving in the minimum risk maneuver section based on a predetermined deceleration of the vehicle and the current speed of the vehicle by using an acceleration formula.

8. The autonomous driving control apparatus of claim 2, wherein the processor is configured to execute the algorithms to calculate the distance from the end point of the operational design domain to the last point capable of activating the autonomous driving function by adding to the distance to the start point of the transition demand one of:

a distance from the end point of the operational design domain to the start point of the transition demand where the vehicle is able to travel for a minimum time after the autonomous driving function is activated; or a minimum distance from the end point of the operational design domain to the start point of the transition demand after the autonomous driving function is activated.

9. The autonomous driving control apparatus of claim 2, wherein, when a distance from a current position of the vehicle to the end point of the operational design domain is greater than the distance from the end point of the operational design domain to the last point capable of activating the autonomous driving function, the processor is configured to execute the algorithms to determine that the autonomous driving function is able to be activated.

10. The autonomous driving control apparatus of claim 9, wherein the processor is configured to execute the algorithms to generate a driving path based on surrounding information and a precision map and to perform autonomous driving control based on the driving path when the autonomous driving function is able to be activated.

11. The autonomous driving control apparatus of claim 1, wherein the end point of the operational design domain comprises:

when a forward driving lane is a highway or an exclusive road for automobiles, a point at which the highway or the exclusive road ends;

a point of entering an interchange or a junction on the highway or the exclusive road;

a tollgate entry point on the highway or the exclusive road;

a point at which the forward driving lane enters a rest area lane;

a point at which the forward driving lane enters a merging lane;

a point at which the forward driving lane enters a reversible lane; or a point at which the forward driving lane enters a bus-only lane.

12. The autonomous driving control apparatus of claim 1, wherein the processor is configured to execute the algorithms to define the driving strategy of the transition demand section and the minimum risk maneuver section while performing autonomous driving control using a precision map including lane information, road properties, and lane properties, in a conditional autonomous driving step of an autonomous driving function stage.

13. A vehicle system comprising:
a sensing device configured to sense surrounding information of a vehicle;
a map database configured to store a lane-based precision map; and
an autonomous driving control apparatus configured to:
estimate an end of an operational design domain of an autonomous driving function in advance;
calculate a distance from an end point of the operational design domain to a start point of a transition demand requesting to transfer driving control to a driver during autonomous driving, the start point of the transition demand being a point at which a transition demand section starts based on a current speed of the vehicle at a time of entering the transition demand and a predetermined speed limit of the transition demand section for requiring the driver to drive the vehicle before reaching the operational design domain and a predetermined acceleration set for stopping in a minimum risk maneuver section including a strategy to slow down and stop the vehicle when a dangerous situation occurs during autonomous driving;
control autonomous driving of the vehicle using the distance from the end point of the operational design domain to the start point of the transition demand, the surrounding information of the vehicle and the precision map, wherein the transition demand section indicates a section waiting for the driver to transfer control authority, and the minimum risk maneuver section indicates a section for aiming to enable to stop the vehicle in a lane without transferring control authority;
calculate the distance from the end point of the operational design domain to the start point of the transition demand starting requesting in real time based on the current speed of the vehicle, calculating the distance comprising summing a maximum mileage that the vehicle is capable of driving in the transition demand section and a maximum mileage that the vehicle is capable of driving in the minimum risk maneuver section; and
initiate the transition demand starting requesting at the start point of the transition demand starting requesting calculated in real time.

14. The vehicle system of claim 13, wherein the autonomous driving control apparatus is configured to calculate a distance from the end point of the operational design domain to a last point capable of activating the autonomous driving function based on a distance to the start point of the transition demand.

15. An autonomous driving control method performed by a processor, the autonomous driving control method comprising:
estimating an end of an operational design domain of an autonomous driving function in advance;
calculating a distance from an end point of the operational design domain to a start point of a transition demand, wherein the start point of the transition demand requesting to transfer driving control to a driver during autonomous driving is a point at which a transition demand section starts based on a current speed of a vehicle at a time of entering the transition demand and a predetermined speed limit of the transition demand section for requiring the driver to drive the vehicle before reaching the operational design domain and a predetermined acceleration set for stopping in a minimum risk maneuver section including a strategy to slow down and stop the vehicle when a dangerous situation occurs during autonomous driving;
controlling autonomous driving of the vehicle using the distance from the end point of the operational design domain to the start point of the transition demand, wherein the transition demand section indicates a section waiting for the driver to transfer control authority, and the minimum risk maneuver section indicates a section for aiming to enable to stop the vehicle in a lane without transferring control authority;
calculating the distance from the end point of the operational design domain to the start point of the transition demand starting requesting in real time based on the current speed of the vehicle, calculating the distance comprising summing a maximum mileage that the vehicle is capable of driving in the transition demand section and a maximum mileage that the vehicle is capable of driving in the minimum risk maneuver section; and
initiating the transition demand starting requesting at the start point of the transition demand starting requesting calculated in real time.

16. The autonomous driving control method of claim 15, further comprising calculating a distance from the end point of the operational design domain to a last point capable of activating the autonomous driving function which is an end point of a section where the autonomous driving function is capable of activating based on a distance to the start point of the transition demand,
wherein calculating the distance from the end point of the operational design domain to the last point capable of activating the autonomous driving function comprises:
executing algorithms to calculate a distance from the end point of the operational design domain to the start point of the transition demand by summing the maximum mileage that the vehicle is capable of driving in the transition demand section and the maximum mileage that the vehicle is capable of driving in the minimum risk maneuver section and then adding a design margin thereto.

17. The autonomous driving control method of claim 16, wherein calculating the distance from the end point of the operational design domain to the start point of the transition demand comprises:
calculating the maximum mileage that the vehicle is capable of driving in the transition demand section using a predetermined maintaining time of the transition demand section which is capable of driving in the transition demand section during a predetermined time for the transition demand section and the current speed of the vehicle; and
calculating the maximum mileage that the vehicle is capable of driving in the minimum risk maneuver section which is capable of driving in the minimum risk maneuver section during a predetermined time for the minimum risk maneuver section based on a predetermined deceleration of the vehicle and the current speed of the vehicle by using an acceleration formula.

18. The autonomous driving control method of claim 16, wherein calculating the distance from the end point of the operational design domain to the last point capable of activating the autonomous driving function comprises:
adding to the distance to the start point of the transition demand one of:

the distance from the end point of the operational design domain to the start point of the transition demand where the vehicle is able to travel for a minimum time after the autonomous driving function is activated, or a minimum distance from the end point of the operational design domain to the start point of the transition demand after the autonomous driving function is activated; and calculating the distance from the end point of the operational design domain to the last point capable of activating the autonomous driving function.

19. The autonomous driving control method of claim 15, further comprising determining that the autonomous driving function is able to be activated when a distance from a current position of the vehicle to the end point of the operational design domain is greater than the distance from the end point of the operational design domain to a last point capable of activating the autonomous driving function.

20. The vehicle system of claim 13, wherein the autonomous driving control apparatus is further configured to add a design margin to the calculated distance from the end point of the operational design domain to the start point of the transition demand.

* * * * *